(12) United States Patent
Tennant et al.

(10) Patent No.: US 7,274,011 B2
(45) Date of Patent: Sep. 25, 2007

(54) SPECTRAL IMAGER AND FABRICATION METHOD

(75) Inventors: William E. Tennant, Thousand Oaks, CA (US); William J. Gunning, III, Newbury Park, CA (US); Jose M. Arias, Simi Valley, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 163 days.

(21) Appl. No.: 11/023,902

(22) Filed: Dec. 27, 2004

(65) Prior Publication Data

US 2006/0138313 A1    Jun. 29, 2006

(51) Int. Cl.
G01J 3/50 (2006.01)

(52) U.S. Cl. .................................................. 250/226

(58) Field of Classification Search ............ 250/308.1, 250/226, 227.18, 227.23, 227.24, 208.1, 250/216; 385/12–15, 31, 36; 356/300, 303, 356/305, 465, 352, 416, 419, 328
See application file for complete search history.

(56) References Cited

U.S. PATENT DOCUMENTS

| | | | | |
|---|---|---|---|---|
| 4,551,629 A | | 11/1985 | Carson et al. | 250/578 |
| 4,568,960 A | | 2/1986 | Petroff et al. | 357/30 |
| 4,586,068 A | | 4/1986 | Petroff et al. | 357/30 |
| 4,672,737 A | | 6/1987 | Carson et al. | 29/572 |
| 4,757,210 A | | 7/1988 | Bharat et al. | 250/278 |
| 4,902,136 A | * | 2/1990 | Mueller et al. | 356/419 |
| 4,956,555 A | | 9/1990 | Woodberry | 250/339 |
| 5,128,798 A | * | 7/1992 | Bowen et al. | 359/260 |
| 5,144,498 A | * | 9/1992 | Vincent | 359/85 |
| 5,157,258 A | | 10/1992 | Gunning, III et al. | 205/339 |
| 5,432,729 A | | 7/1995 | Carson et al. | 365/63 |
| 5,610,389 A | | 3/1997 | Asatourian | 250/216 |
| 5,784,507 A | | 7/1998 | Holm-Kennedy et al. | 385/31 |
| 6,226,083 B1 | | 5/2001 | Schwerzel et al. | 356/305 |
| 2005/0205758 A1 | * | 9/2005 | Almeida | 250/208.2 |

FOREIGN PATENT DOCUMENTS

EP      1184708 A    3/2005

OTHER PUBLICATIONS

L. W. Schumann, et al., "Design Constraints on Advanced Two-Dimensional LWIR FOCAL Planes for Imaging Fourier Transform Spectrometer Sensors", (1997) The Aerospace Corporation, Los Angeles, CA. SPIE vol. 3063, pp. 150-163
Breckenridge, James B., "Evolution of Imaging Spectrometry Past, Present and Future", (1996) Jet Propulsion Laboratory, CA. Inst. of Tech., Pasadena, CA. SPIE vol. 2819, pp. 2-6.
A.T. Pritt, Jr., et al., "Imaging LWIR Spectrometers for Remote Sensing Applications", (1997) The Aerospace Corporation, El Segundo, CA. SPIE vol. 3063, pp. 138-149.

* cited by examiner

*Primary Examiner*—Thanh X. Luu
(74) *Attorney, Agent, or Firm*—Koppel, Patrick, Heybl & Dawson

(57) ABSTRACT

A spectral imager includes an elongate light propagation medium that receives light at one end, has graded average spectral absorption properties in the elongate direction, and spectral detectors distributed in the elongate direction. The spectral absorption properties of the medium can be graded in both elongate and transverse directions. Both linear and two-dimensional arrays can be formed, enabling simultaneous hyperspectral detection.

61 Claims, 8 Drawing Sheets

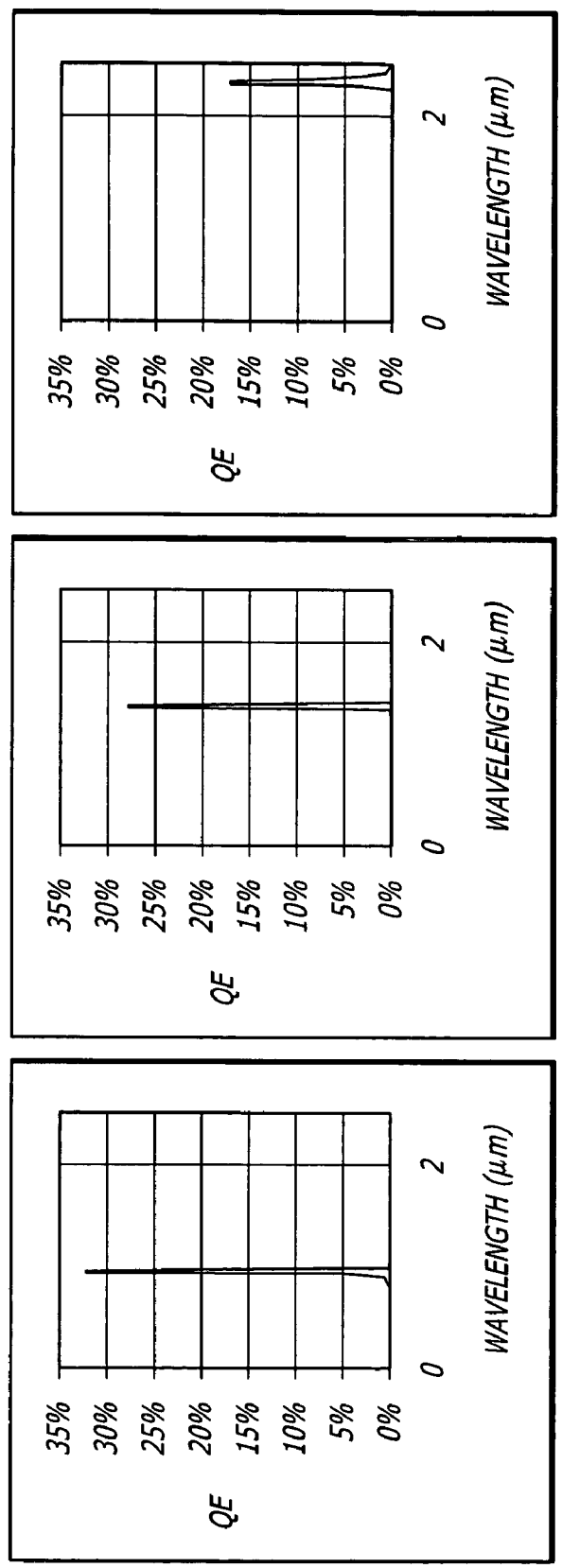

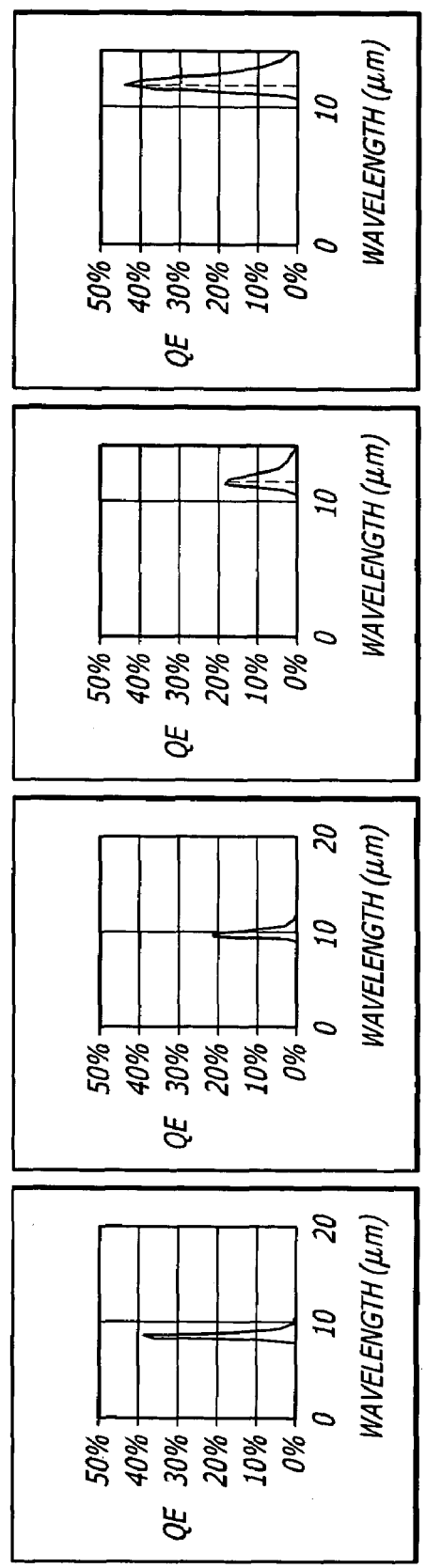
FIG. 13a  PIXEL 1 OF 20  9% FWHM
FIG. 13b  PIXEL 10 OF 20  10.2% FWHM
FIG. 13c  PIXEL 20 OF 20  12.5% FWHM
FIG. 13d  PIXELS 19 AND 20 OF 20  13.6% FWHM

SPECTRAL IMAGER AND FABRICATION METHOD

BACKGROUND

1. Field of the Invention

This invention relates to spectrometry, and more particularly to a spectral imager and associated fabrication method with graded effective spectral absorption properties in the elongate direction of a light propagation medium.

2. Description of the Related Art

Spectral imagers detect radiation emitted from or reflected by a scene area in two or more colors. Spectral imagers in general can be characterized as "multispectral" or "hyperspectral". Multispectral devices (like the human eye) are capable of detecting the image of a scene in only a few wavebands of light, while hyperspectral devices can detect the image in many more wavebands.

Multispectral imagers can be formed in several ways, for example by having fixed filters covering several spectral bands in a scanning system, by serially placing several different filters over a broad band imaging array, or by stacking semiconductor layers containing area arrays of single detector picture elements, typically photodiodes or photoconductors, of different material compositions which absorb progressively longer wavelengths, registering the detector arrays to each other within the stack to form an array of multispectral picture elements (pixels), and making contacts to each layer's detector within each pixel. A major surface of the device is illuminated, and the amount of light absorbed by each layer in each pixel is detected from its in-pixel contact to sense the spectral content of the light, typically within two or three wavebands.

Several different approaches have been taken to hyperspectral imaging. Current imagers use a two-dimensional array of detectors. The hyperspectral image of the scene (often called a hypercube), however, is three dimensional, with two spatial dimensions and one spectral dimension. With only two dimensions available in the detector array, the third must be obtained over time with multiple frames of data from the array. This need for time multiplexing has led to two major alternative approaches to hyperspectral imaging, and one combined approach. One major type of hyperspectral imager includes systems in which the two scene spatial dimensions are collected simultaneously while the wavelength information is multiplexed over time, such as by using a rotating spectral filter wheel, a tunable Fabry-Perot interferometer, or a Michaelson interferometer (which interferes many different wavelengths to obtain an interferrogram whose Fourier transform represents the spectrum of the incident light). An alternate approach images simultaneously a single row of scene spatial information in one array spatial dimension and disperses, for instance with a prism or diffractometer, the spectral information from each of the scene elements of this row in the other array spatial dimension. The other scene spatial dimension is then scanned in a transverse direction over time.

In each of these prior approaches, hyperspectral imagery requires complex optics. A hybrid approach again employs an array of detectors preceded by a linear variable filter placed in close proximity to the array to select a different wavelength from each row of the scene to be detected by each row of pixels. To obtain the complete hypercube the scene must be scanned across the area array. This process avoids the complexity of the moving optical parts of the first approach (in which spectral information is obtained over time), but suffers from the need for delicate alignment of the filter, the need to have relatively slow optics, and filter inefficiency and difficulty of fabrication. Moreover, all of these approaches may require the detector array to be cooled to a temperature sufficiently low that the detector dark current is well below the photocurrent. This is hard to do for a wide spectral range since long wavelength detectors have, for basic physics reasons, exponentially higher dark currents than do short wavelength detectors.

SUMMARY OF THE INVENTION

The present invention seeks to provide a spectral imager, along with an associated fabrication method, that is capable of detecting many different wavebands with a high degree of accuracy and resolution, is comparable in size to the smallest prior hyperspectral devices, and can be adapted for simultaneous detection of a large number of wavebands over a two-dimensional array.

These goals are achieved with an elongate light propagation medium arranged to receive light at one end of the elongate dimension, having graded effective spectral absorption properties in the elongate direction, and with light detectors distributed along the medium in the elongate direction to detect light absorbed by the medium at the detector locations.

In one embodiment of the invention, the optical medium's spectral absorption properties have a gradient in the elongate direction ("x" dimension) of the medium, and also in a transverse direction ("z" dimension). This can be established by growing on a substrate the optical medium with a graded spectral absorption in the z direction transverse to the substrate, and its x dimension parallel to the substrate. The thickness of the medium is then varied along its x direction, preferably by beveling the exposed elongate surface to remove different amounts of the graded absorbing medium at different x locations. Subsequently, the z dimension grading may be removed if desired by an interdiffusing anneal, leaving only the x dimension grading. Alternatively, grading in the z dimension may be effectively translated into the x dimension by beveling the second surface to make it parallel to the first, creating a uniform-thickness layer. Optical detectors are then distributed along the medium in the x direction and a readout circuit connected to the detectors, such as by flip-chip bonding. It is also contemplated that advanced growth techniques may be devised to produce the elongate grading without subsequent beveling of the medium. The medium's length in the x direction is preferably at least an order of magnitude greater than its thickness.

Resonator cells can also be established in the x direction, such as by sets of distributed Bragg reflectors, to increase the device's sensitivity and resolution. These reflectors would be constructed in a manner tuned to enhance the narrow range of wavelengths desired for absorption at each x position along the graded absorbing medium. The medium's length is preferably at least an order of magnitude greater than its thickness.

The light propagation medium can be divided into a linear array of elongate rectangular parallel plank-like channels, with the light receiving end of each plank serving as an individual pixel. The planks can be formed by channelizing the optical medium with plank walls, coated if needed, to insure that reflection confines light propagation within the plank, while a two-dimensional pixel array can be established by stacking a plurality of linear arrays.

These and other features and advantages of the invention will be apparent to those skilled in the art from the following detail description, taken together with the accompanying drawings.

BRIEF DESCRIPTION OF THE DRAWINGS

FIGS. 12a, 12b and 12c are graphs showing the calculated response of a spectral imager in accordance with the invention in a relatively low wavelength regime; and FIGS. 13a, 13b, 13c and 13d are graphs illustrating the response of a spectral imager in accordance with the invention in a relatively higher wavelength regime.

DETAILED DESCRIPTION

Figure 1:
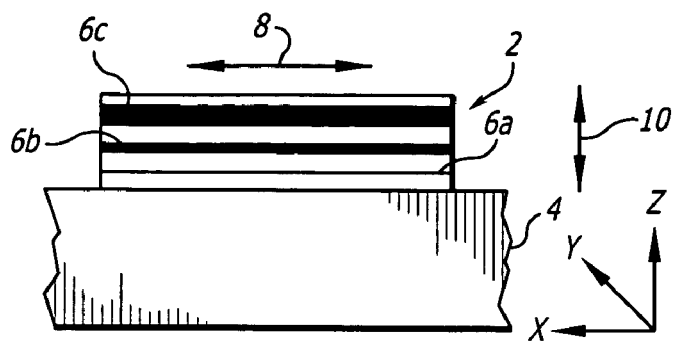
FIGS. 1, 2, and 3 are sectional views of three successive stages in the fabrication of a spectral imager in accordance with the invention.
Figure 2:
Figure 3:
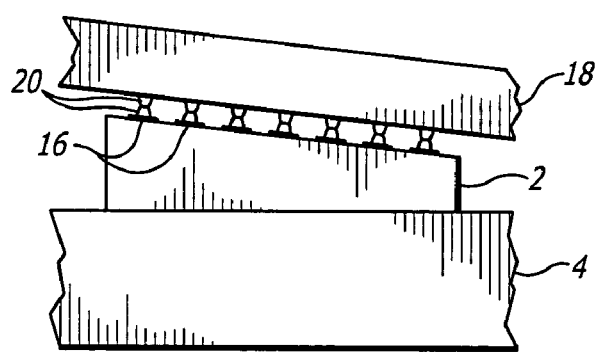

FIGS. 1-3 illustrate successive stages in the fabrication of a hyperspectral imager that provides a high degree of spectral resolution in a compact package that can be customized to detect desired ranges of wavelengths. As illustrated in FIG. 1, an elongate light propagation medium 2 with tuned spectral absorption properties is grown on a substrate 4, typically by epitaxial growth, with a gradient in the medium's bandgap energy in the transverse z direction away from the substrate. As an alternate to a continuous bandgap energy gradient, the medium 2 could be formed as an accumulation of discrete layers, with progressively varied bandgap energies from layer to layer.

For purposes of this application, the term "light" is not limited to visible light, but rather includes all wavelengths within the electromagnetic spectrum for which corresponding absorbent materials are available for spectral analysis. The invention may potentially be implemented in any of a variety of materials systems. Most suitable for infrared applications would be the HgCdTe pseudobinary system, which can be grown epitaxially by a variety of techniques onto CdZnTe substrates or lattice-mismatched substrates like silicon or GaAs. Techniques for growing HgCdTe by epitaxy are well known, including how to grow the material with progressively changing bandgap. Other II-VI related systems such as HgZnTe, HgMnTe, HgCdSe as well as quaternaries of these materials could be used. Other suitable infrared materials systems would be the IV-VI compounds (PbS, PbTe, PbSe, SnTe, SnSe, etc.) and their ternary and quaternary alloys. Near-infrared to visible materials systems include both the III-V compounds (GaAs, AlAs, InP, etc.) and their alloys, as well as the wider bandgap II-VI compounds (ZnS, CdS, ZnSe, ZnTe, CdTe, etc. and their alloys). Suitable materials for other wavelength ranges are well known. Finally, structured materials could be used whose spectral absorption properties are determined by the thickness and bandgap profile of multiple layers or islands of different semiconductors; one example is the strained-layer superlattice (SLS) and another is the quantum well infrared photoconductor or QWIP. In this latter case the absorption can have a narrow range of wavelengths, permitting illumination from either end of the elongate structure.

In FIG. 1, the grading of bandgap energies is indicated by a light shading 6a towards the bottom of optical medium 2, corresponding to a relatively high bandgap energy and an associated relatively low wavelength absorption, with a progressively decreasing bandgap energy and a corresponding increasing wavelength absorption towards the top of the medium, indicated by progressively thicker shading 6b and 6c. Thus, the lower portion of optical medium 2 near substrate 4 will exhibit a relatively higher bandgap energy and a relatively lower cutoff wavelength (the wavelength below which light will not be transmitted), while portions of the medium further away from substrate 4 will exhibit a lower bandgap energy and a corresponding higher wavelength cutoff.

For a $Hg_{1-x}Cd_xTe$ system, the lower portion of medium 2 could have a Cd component of 40%, corresponding to a cutoff wavelength of about 2.5 microns. The percentage of Cd would be tuned during further epitaxial growth to decrease progressively down to say 20% at the upper end of the medium, corresponding to a cutoff wavelength of about 10 microns. Thus, the lowest portion of the medium towards the substrate will transmit a relatively high wavelength range, with the longer wavelength limit of the transmitted waveband progressively increasing further away from the substrate.

For purposes of illustration, the figures are not to scale. The elongate (x) dimension of the medium, indicated by double-ended arrow 8, in practice is much longer than the transverse (z) dimension, indicated by double-ended arrow 10. For example, the x dimension could be on the order of 1 cm, with the z dimension on the order of 10 microns. In general, it is preferable that the medium be at least an order of magnitude longer than it is thick in order to accommodate a multiplicity of different spectral bands.

In the next step of fabrication, illustrated in FIG. 2, the thickness of optical medium 2 is varied along its length, preferably by forming a bevel 12 in the medium's upper surface which, in the example of the figure, slopes down from left to right so that the medium's upper and lower surfaces are angled to each other. The bevel can be established by standard etching, polishing, or ion milling techniques. For an optical medium that is initially about 10-20 microns thick, the thickness at the thinner end of the bevel 14 will typically be about 3-5 microns, although other bevel slopes may also be desirable. Thickness reductions other than a continuous straight line bevel may also be desirable, such as curves or straight line segments. In general, the shape of the medium's upper surface can be employed as a factor in establishing the medium's spectral response along its length.

The effect of the bevel 12 is to alter progressively the medium's spectral absorption properties in the x direction. Because more and more of the higher wavelength cutoff material is removed from left to right as shown in FIG. 2, the right end of the medium has a preponderance of lower cutoff wavelength material, while the left end of the medium has a preponderance of higher cutoff wavelength material. Thus, the effective or average cutoff wavelength progressively increases from right to left. As light enters the medium from the right edge 14, it will spread to fill the medium as it propagates from right to left, due to internal reflections and diffraction; incident light typically includes significant components that are not perfectly parallel to the medium's lower surface. Thus, as the light propagates down the medium it will encounter progressively higher cutoff wavelength material. This will result in lower wavelengths being absorbed at the incident end of the medium and higher wavelengths transmitted, with progressively higher wavelengths absorbed as the light continues to propagate through the medium.

Based upon the material employed, its compositional grading and the dimensions of the medium, including the slope of bevel 12, the locations along the elongate dimension of the medium at which different wavelengths will be absorbed can be established. This in turn enables a spectral analysis of the incident light to determine its spectral content by sensing the amount of light absorbed at different x locations along the medium.

The x direction 8 with its bevel 12 provides a large surface for the placement of optical absorption detectors, in contrast to edge detectors employed in the past. The relatively long distance which light travels from one end of the detector to the other also allows for a high spectral detection resolution. The absorption coefficient of the medium at wavelengths shorter than its absorption edge typically ranges from a few hundred to more than one thousand inverse centimeters ($cm^{-1}$). This translates to a requirement that light travel through the medium from a few microns to a few tens of microns to be absorbed near the bandgap. The long propagation path provides more room for adequate absorption at each waveband of interest. The optical medium 2 can be tailored to respond over a desired wavelength range simply by fabricating it so that it absorbs light at the lower end of the desired range near its input edge 14, and at the upper end of the range near its opposite edge. The natural limit on spectral resolution without resonant enhancement is determined by the basic absorption sharpness of the medium.

To provide a spectral readout from the device, photodetectors 16 are distributed along the beveled surface of the optical medium in the x direction, as illustrated in FIG. 3. The photodetectors are preferably photodiodes, which can be formed in HgCdTe by a variety of methods, but desirably by As doping with a photolithographically-isolated ion implant. An integrated circuit (IC) chip 18 with appropriate readout circuitry can then be connected to the diodes, such as by a common "flip-chip" mounting technique illustrated in the figure. Corresponding sets of conductive "bumps" 20, typically In, are provided from the input cells (sub-circuits) of the IC chip 18 and the diodes 16 to join, electrically and mechanically, the readout circuit to the photodiodes. Other readout techniques, such as wire bonding the photodiodes to a separate readout circuit, could also be employed, but the flip-chip technique results in a desirable unitary structure for the spectrometer. After the optical medium 2 has been mounted to the chip 18 the substrate 4 would typically be removed, which can be accomplished by mechanical polishing followed by chemical etching. Another alternative approach would be to deposit the planks on the IC first, remove the substrate, and photolithographically form electrical connections from the photodiodes on each plank to an input cell contact located in the channel adjoining the plank. This technique has the relative advantages and disadvantages that will be clear to those knowledgeable in the art.

Figure 4:
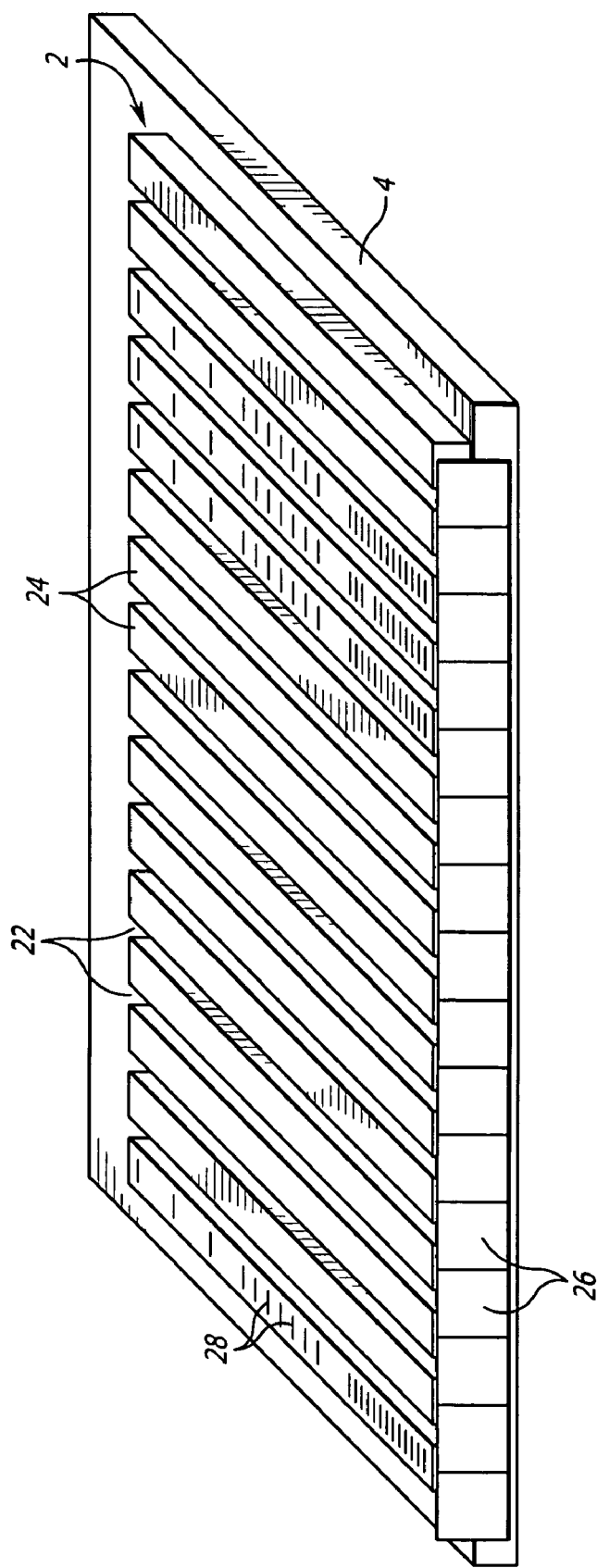
FIG. 4 is a perspective view of a linear spectral imager in accordance with the invention, with distributed Bragg reflectors and input light collectors.

An intermediate stage in the fabrication of a linear array of spectral detectors is illustrated in FIG. 4. In this example, which is again not to scale, an optical medium 2 on a substrate 4 is grown with a graded bandgap and beveled as described above (only a slight bevel is illustrated for simplicity). A series of parallel elongate openings 22 are then formed through the optical medium to separate it into a series of parallel spectral analyzer channels (which may be visualized as planks) 24, each of which has common spectral response characteristics. The openings are preferably established by reactive ion etching through the optical medium and into the substrate.

The analyzer planks are then annealed to remove damage, followed by a passivation coating with an insulator such a CdTe. Holes are next opened in the passivation over the diode circuitry, followed by the evaporation of metal contacts such as In, suitable for flip-chip bonding, into the diodes. This is followed by flip-chip bonding a single chip with individual readout input circuits for each detector in each channel over the detector array, after which the openings between channels and the areas around the flip-chip bumps are back-filled with a protective, epoxy with index suited to preserve the optical isolation between channels. Alternatively, the channels may be coated with a reflecting metal over the passivation prior to In deposition and flip-chip bonding. The substrate 4 is then removed, followed by another passivation of the surface revealed by the substrate removal. Preferably prior to making the flip-chip bond, conductive ground contacts are formed at the end of each row to provide a ground return for the diodes in that row.

A series of microlenses 26 can be provided at the input edges of the channels to collect incident light and focus it onto the respective planks. Microlens fabrication techniques are well known. Each microlens would function as an individual pixel in a linear pixel array. Afocal concentrators, such as Winston cones, could also be used as an alternative to microlenses, and fiber optics could be used in the short wave infrared region. If no light collectors are provided, the input channel edges would themselves function as pixels.

To increase the sensitivity of the spectral image, resonator cells can be distributed along the x dimension of the optical medium, with each resonator tuned to produce an optical resonance at the wavelength band to which each section of the medium is most sensitive. This increases the corresponding photodetector output for the resonance wavelength. Each section of the medium responds to its corresponding wavelength, creating a greater sensitivity and higher spectral resolution. The resonator cells are preferably implemented with conventional distributed Bragg reflectors (DBRs), with the various cells indicated by hash marks 28 in FIG. 4. A DBR employs wavelength-selective reflectors, such as surface gratings transverse to the direction of light propagation. The gratings are periodic structures that reflect light back and forth to establish a resonance only when the grating period is equal to an integer multiple of half the designed wavelength. The DBRs can be used to create Fabry-Perot resonators at the desired wavelength for each photodetector. Each resonator cell, tuned for a particular waveband, would typically be roughly 20-60 microns long, allowing for responses to a large number of different wavebands with an optical medium 1 cm long, and a corresponding high spectral resolution. DBRs could be provided on any of the four elongate surfaces of each plank, on a combination of the surfaces, or even internally within the planks.

Figure 5:
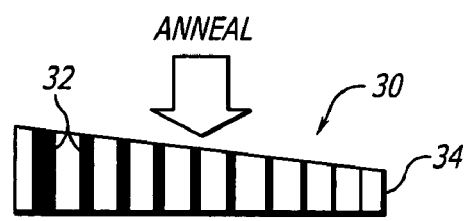
FIG. 5 is a conceptual sectional view of a spectral imager element with the transverse spectral gradient averaged through annealing.

FIG. 5 illustrates a variation on the detector of FIG. 2, with the substrate removed. By an appropriate heating of the spectral detector 2, the compositional grading of the material tends to merge to an average value at local sites. The annealing is performed at a temperature and for a duration that results in an averaging of material composition over a distance within the medium comparable to its thickness at its thicker end. Since the medium is much longer than it is thick, the result a spectral detector 30 with a generally uniform composition through each transverse section, but a graded composition in the elongate direction. This is indicated by the shading, in which transverse composition lines 32 range from light towards the illuminated edge 34 to indicate a relatively higher average bandgap in this region, to heavier lines at the opposite end of the medium to indicate a lower average bandgap in this region. Thus, incident light at the input edge will still experience a progressively higher effective wavelength absorption as it propagates through the medium. While basically the same average composition gradient is encountered in the x direction as in the FIG. 2 detector, the gradient has been mostly removed in the much shorter z direction at each location in the light propagation path.

Figure 6:
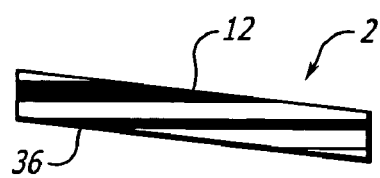
FIG. 6 is a conceptual sectional view of a spectral imager element with spectral response gradients along opposite elongate surfaces.

Another variation on the basic optical structure of FIG. 2 is illustrated in FIG. 6. In addition to the bevel 12 along one elongate surface of the device, a similar bevel 36 is formed along the opposite elongate surface, preferably parallel to bevel 12. This removes lower bandgap material as light propagates through the medium from right to left, thus increasing the bandgap differential between opposite ends of the light propagation path, with an accompanying increase in the wavelength differential between the opposite ends. As a result, a greater spectral range can be detected for the same device length as in FIG. 2.

A structure as shown in FIG. 6 requires more fabrication steps and is generally more difficult to accomplish than the detector of FIG. 2. It can be fabricated by forming a single-bevel on a flip-chip mounting as described above, and then forming the second bevel using the flip-chip as a substrate.

Another approach to creating a variation in the optical absorption properties in the elongate (x) direction is to deposit the absorbing layer on a substrate in a manner in which the properties are deliberately graded during the deposition. One possible way to do this is to use molecular beam epitaxy (MBE), a technique well known in the art of semiconductor alloy materials, to deposit an absorbing layer by using elemental fluxes whose relative concentrations vary in one direction. To some extent these non-uniformities are known and deliberately suppressed in current growth techniques to ensure large areas of uniform material.

Figure 7:
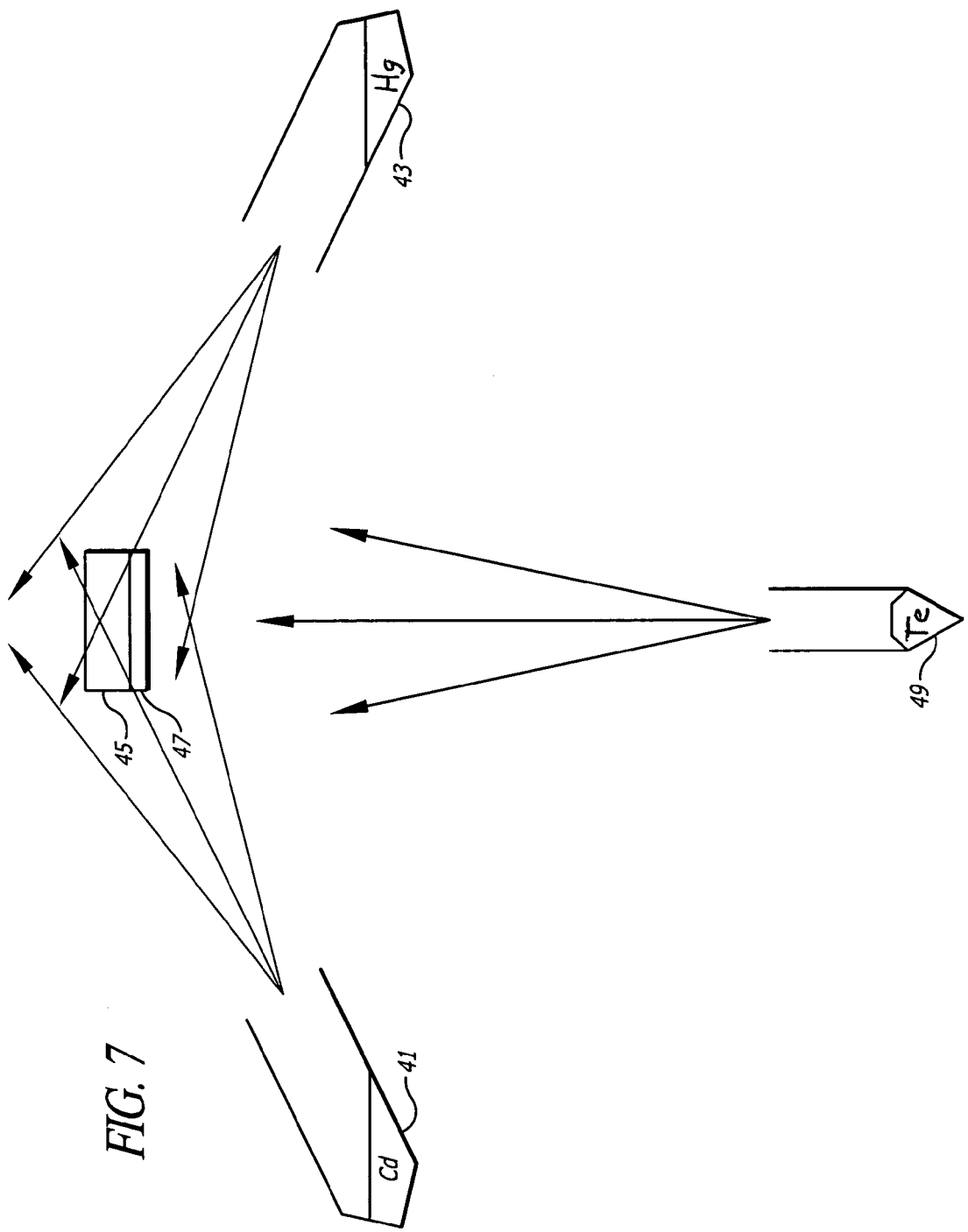
FIG. 7. is a block diagram of a molecular beam epitaxy technique that can be used to fabricate the spectral imager.

The MBE technique is illustrated in FIG. 7. Cd and Hg sources 41 and 43, respectively, are positioned relatively close to a substrate 45 upon which the spectral imager epilayer 47 is to be grown, and are angled with respect to the substrate surfaces on opposite sides of the substrate. A Te source 49 is positioned more distant from and normal to the substrate surface. With the Cd source 41 to the left and the Hg source 43 to the right of the substrate as shown, the concentration of both constituents within the epilayer 47 will be graded, with the proportion of Cd progressively increasing from right to left, and the proportion of Hg progressively increasing from left to right. The Te will be uniformly distributed, since the Te source 49 is normal to the substrate. The higher concentration of Cd towards the left results in a progressively higher bandgap and shorter wavelength sensitivity in this direction, with the bandgap progressively falling and the wavelength sensitivity progressively increasing from left to right. This fabrication technique may be particularly useful for large arrays.

Figure 8A:
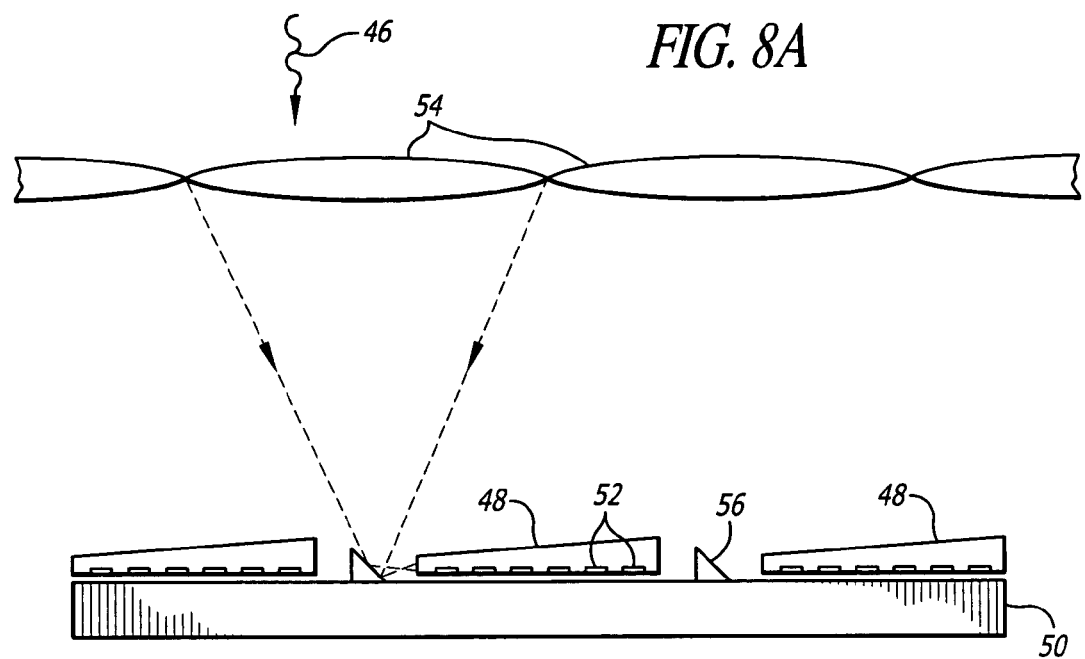
FIG. 8A is an elevation view of a spectral imager with a transverse light collection capability.

In the embodiments described thus far, the spectral imager is edge illuminated with light traveling generally in its x direction. The structure can be easily adapted to light 46 traveling in the z direction, as illustrated in FIG. 8A. In this example, a series of detectors 48 are mounted end-to-end on a common substrate 50, with gaps between the facing ends of each successive pair of detectors. Sets of individual photodetectors 52 are provided on each element and read out by circuitry on the substrate 50. A series of large microlenses 54, which may be anamorphic, focus the incoming light 46 towards redirector elements 56, which direct the light into the receiving edges of respective analyzers 48. The redirectors 56 can consist of simple angled reflectors positioned on the substrate in front of each analyzer, or could also use refraction. Although a serial arrangement of analyzers is illustrated in FIG. 8A, the analyzers could also be arranged side-by-side, as in FIG. 4, with a light redirector again positioned in front of each pixel.

Both the detectors 48 and reflectors 56 can be fabricated with known grey scale photolithography techniques using shaped photoresist layers on the beginning substrate, and the substrate placed in a dry etcher to imprint the photoresist shape into the substrate. Typical dry etching techniques include ion milling, reactive ion etching (RIE) and inductively coupled plasma etching.

Figure 8B:
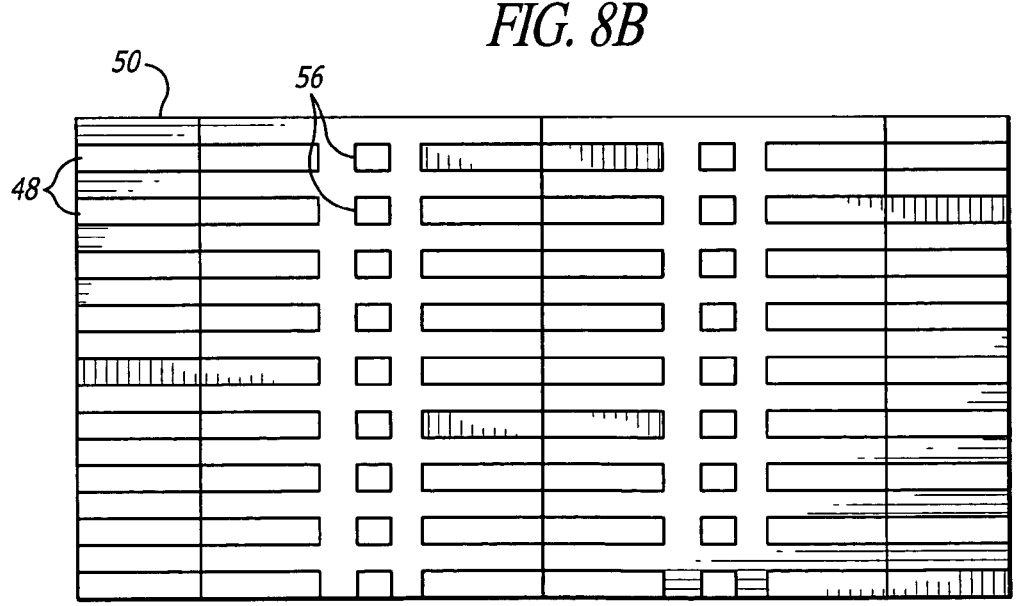
FIGS. 8B and 9 are plan views of the spectral imager substrate shown in FIG. 8A, and of an alternate spectral imager configuration with square light collectors, respectively.
Figure 9:
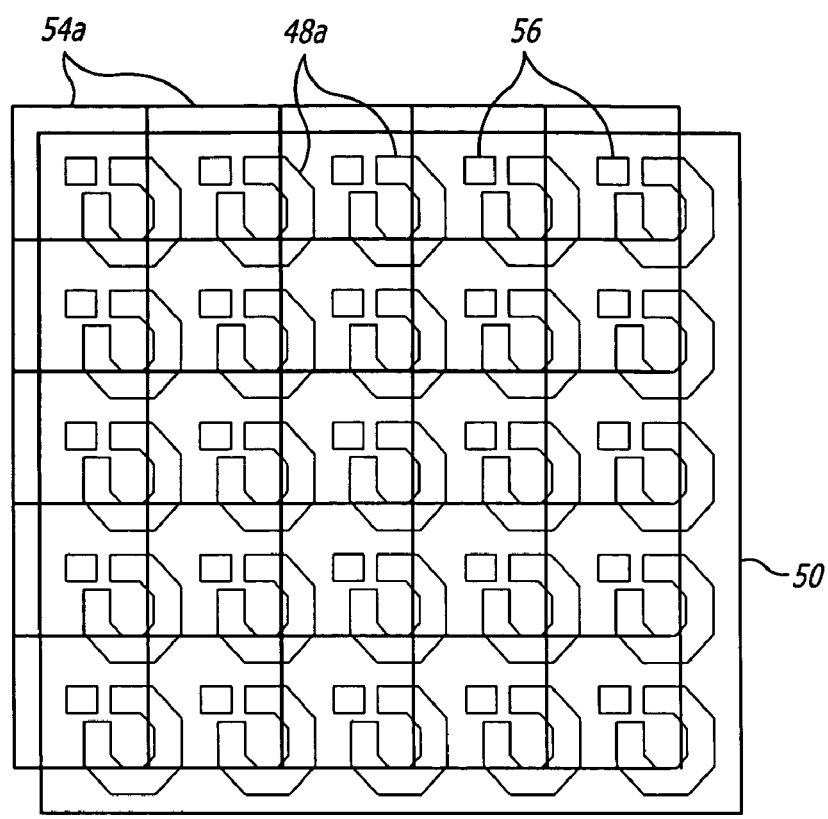

A plan view showing an array of elongate rectangular detectors 48 and corresponding reflectors 56 on the substrate 50 is given in FIG. 8B. The lenses 54 would typically be rectangular along their edges, with each lens encompassing a number of detectors. For greater resolution and to reduce the aberrations normally associated with rectangular lenses, circular or square lenses 54a could be used, and the elongate detectors could be curved into generally circular shaped detectors 48a as illustrated in FIG. 9. Reflectors 56 would still be used to redirect light from the lenses into the detectors. With each detector 48a/reflector 56 pair occupying an area slightly less than the corresponding lens, the number of pixels in the array would be equal to the number of detectors, and there would be fewer aberrations than with the rectangular lenses. Other curved, segmented or meandering geometries could also be used for the elongate detectors.

Figure 10:
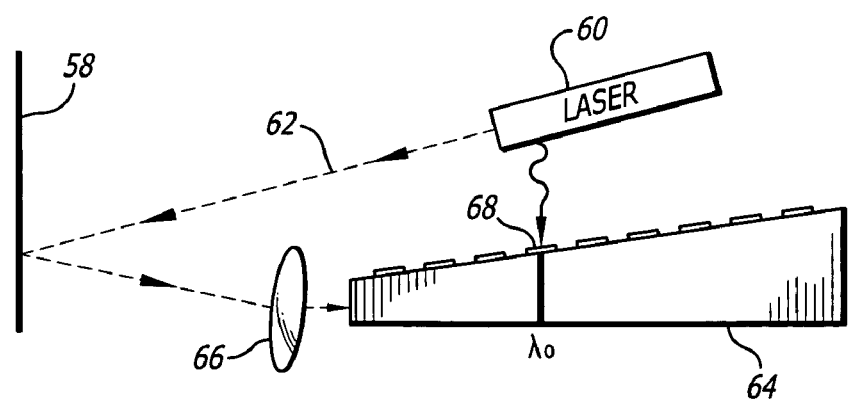
FIG. 10 is an elevation view illustrating the active-passive-illumination operational mode of a spectral imager of the type illustrated in FIG. 4 indicating how hyperspectral capability allows for multi-mode interpretation of a scene.

As described thus far, the spectral imager operates in a passive manner, with all of the analyzer channels in a given array operated continuously and simultaneously with all of the other channels. However, if desired different photodetectors could be simultaneously operated in different respective modalities. For example, selected active readouts could also be obtained from selected channels or detectors within channels, over less than the full wavelength range of the channels if desired, as illustrated in FIG. 10. In this example, it is desired to determine the distance of a reflector 58 from the imager. A laser 60 emits a beam 62 at a wavelength $\lambda_0$, which is reflected off reflector 58 and back to a spectral analyzer 64, which may include a light collector 66 at its input edge. Turning on the laser triggers the detection circuitry for a particular photodiode 68 at a location along the analyzer that responds to $\lambda_0$, either when the laser is first turned on or a preset period of time afterwards, so that the time differential between turning on the laser and the photodiode 68 detecting a response can be determined to calculate the distance to the reflector 58. The spectral subpixel represented by the analyzer's cross-section at the location of photodiode 68 is thus operated in an active fashion, while the other channels and even the remaining subpixels at other wavelengths in the same channel can be operated in a normal passive mode.

Figure 11:
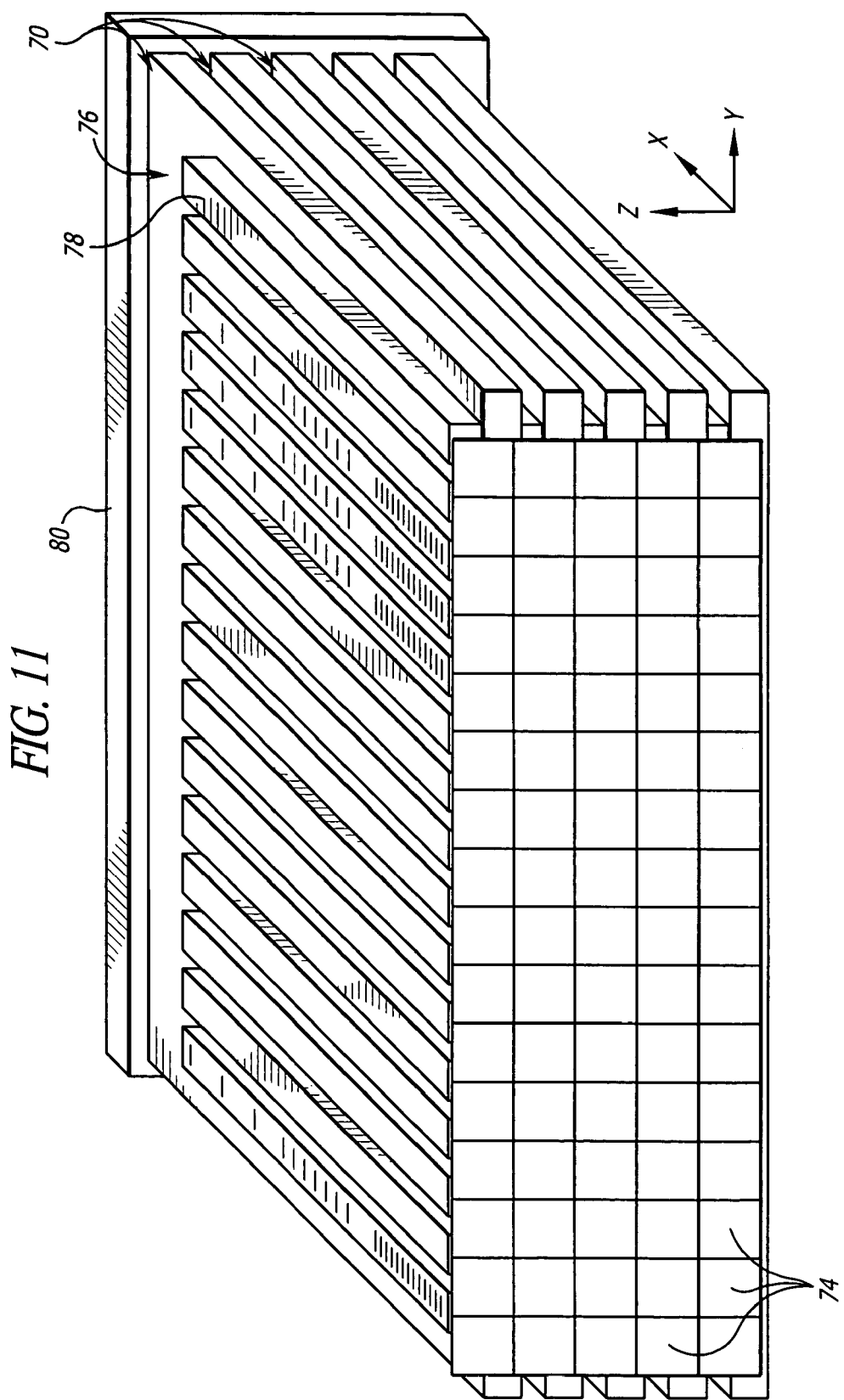
FIG. 11 is a perspective view of a number of linear spectral imagers of the type illustrated in FIG. 4, stacked into a two-dimensional pixel array.

The linear pixel array of FIG. 4 can be expanded to a two-dimensional array, thus enabling the simultaneous detection of many different wavelengths over a two-dimensional spatial field, without having to scan in either spatial direction or in wavelength. Such an array is illustrated in FIG. 11, in which a number of linear spectral imager arrays 70, each with a structure as in FIG. 4, are stacked to form a three-dimensional (x, y, z) structure that presents a two-dimensional (x, y) array of pixels 74 at the forward edges of the individual analyzer channels. The readout circuitry for each individual analyzer, indicated conceptually by connector lines 76 for the upper right-hand analyzer 78, is preferably connected to a common back side readout structure 80, which can be designed to either read out the signals from the various linear arrays in a multiplexed fashion, or simultaneously be designed to if a greater amount of circuitry can be accommodated. The readout circuitry can also be designed to perform desired signal processing on the read out signals. The basic techniques for stacking and interconnecting circuit substrates are well known, and are described for example in Irvine Sensors Pat. No. 4,551,629, with additional approaches in many subsequent Irvine sensors patents such as U.S. Pat. No. 4,672,737 and U.S. Pat. No. 5,432,729. Instead of coupling the spectral imager outputs through a backside structure, holes could be drilled through the various substrates and the stack mounted to a lower circuit board.

The result of stacking the linear pixel arrays in this manner is a two-dimensional pixel array with a high degree of sensitivity, both spectrally and spatially.

Modeled results with a single analyzer 1 cm long formed from HgCdTe, where the Cd component was varied from 0.9 to 0.5 over the length of the analyzer, are given in FIGS. 12*a*, 12*b* and 12*c*. The analyzer was assumed to be divided into 128 wavelength pixels along its length, with each pixel 78.13 microns long in the elongate direction for a total of 1 cm. At each pixel, the portion of the analyzer's thickness having a composition that responds to the desired wavelength was assumed to be 5% of the total layer thickness, and the device was assumed to operate at a temperature of 160° K. The quantum efficiency (QE) of the spectrometer, corresponding to its response to the incident light at the designed wavelengths for pixels 3, 64 and 128, are given in FIGS. 12*a*, 12*b* and 12*c*, respectively. The full-width half-maximum (FWHM) values corresponding to the width of the response spikes at half the spikes' maximum values, as a percentage of the spikes' center frequencies, were 2.1% for pixel 3, 1.5% for pixel 64, and 2.3% for pixel 128.

These results were obtained without the use of DBRs, and were not dependent upon the incoming light's angle of incidence or the focal number of the optics. They demonstrate a high degree of resolution in a hyperspectral device capable of simultaneously detecting 128 different wavebands.

While the modeling was performed with an assumed temperature of 160° K., the spectral imagers described herein could be operated up to room temperature, depending upon the desired sensitivity, with colder temperatures generally yielding a higher sensitivity. The absolute composition and compositional grading of the material used for the analyzer should be adjusted for different temperatures, since bandgap energies change with temperature.

The modeled response of another 1 cm long analyzer in a longer wavelength regime, with the HgCdTe optical medium having a Cd component graded from 0.24 to 0.21, is shown in FIGS. 13*a*, 13*b*, 13*c* and 13*d*. In this case the absorption volume was assumed to be 10% of the total layer thickness and the analyzer was divided into 20 pixels, each 500 microns long in the spectral direction, with an assumed operating temperature of 120° K.

The modeled outputs from pixels 1, 10, 20 and 19/20 combined are given in FIGS. 13*a*, 13*b*, 13*c* and 13*d*, respectively. The results show a significant spreading of the wavelengths to which the various pixels responded, and generally lower QE. This may be considered as approaching a "worst case" situation, with the addition of DBRs becoming more important. Since the wavelengths are longer and the photolithography does not have to be as exact in this spectral regime, DBRs are easier to fabricate.

The spectral imager described herein has significant advantages. The relatively long light propagation path allows for a relatively low absorption coefficient while still achieving high absorption. The analyzer channels can be customized for desired spectral bands, depending upon their compositional grading and the slope of their bevel, and specific channels can be tuned to receive specific active wavelengths while other nearby channels function passively.

Operating temperatures can be relatively high, resulting in desirably low dark currents, since the bandgap is relatively wide compared to that in thin layers of conventional focal plane arrays. Highly compact, low weight systems with simple optics are possible. The invention has numerous applications, including reconnaissance, surveillance, manned and unmanned platforms, gas detection, detection of earth resources, smoke stack and effluent monitoring, and scientific or medical instruments.

While particular embodiments of the invention have been shown and described, numerous variations and alternate embodiments will occur to those skilled in the art. Accordingly, it is intended that the invention be limited only in terms of the appended claims.

We claim:

1. A spectral imager comprising:
   a first elongate light propagation medium arranged to receive light at one end, and structured to have a spectral absorption coefficient gradient in the elongate direction,
   detectors distributed along said medium in the elongate direction to detect light absorbed by said medium,
   wherein the spectral absorption properties of said medium are graded in the elongate direction along a first surface of said medium,
   wherein the spectral absorption properties of said medium along said first surface are graded from lower to higher wavelengths in the direction of light propagation through said medium,
   wherein said medium includes a second surface opposite said first surface, and
   wherein the spectral absorption properties of said medium along said second surface are ungraded in the direction of light propagation through said medium.

2. The spectral imager of claim 1, wherein said first and second surfaces are angled to each other.

3. The spectral imager of claim 1, wherein said first and second surfaces are parallel to each other.

4. The spectral imager of claim 1, wherein the spectral absorption properties of said medium are substantially uniform in a direction transverse to said elongate direction.

5. The spectral imager of claim 1, wherein said first and second medium surfaces in the elongate direction that are angled to each other.

6. The spectral imager of claim 1, further comprising optical resonator cells distributed along said medium in the elongate direction and tuned to the spectral absorption properties of said medium at their respective locations.

7. The spectral imager of claim 6, said resonator comprising distributed Bragg reflectors along a first elongate surface of said medium.

8. The spectral imager of claim 1, further comprising a readout circuit connected to said detectors to sense the spectral characteristic of light propagating through said medium.

9. The spectral imager of claim 8, wherein said readout circuit includes circuitry to obtain a readout of a different functionality from less than all of said detectors.

10. The spectral imager of claim 8, wherein said readout circuit includes circuitry to monitor continuously each of said detectors, and to obtain a timed readout from less than all of said detectors at a desired time.

11. The spectral imager of claim 1, further comprising additional elongate light propagation media and respective detectors similar to said first medium and its detectors, all of said media collectively comprising a pixel array.

12. The spectral imager of claim 11, wherein said media are optically isolated from each other.

13. The spectral imager of claim 11, said pixel array comprising a linear array.

14. The spectral imager of claim 11, said pixel array comprising a two-dimensional array.

15. The spectral imager of claim 14, said two-dimensional array comprising a plurality of stacked linear arrays.

16. The spectral imager of claim 1, wherein said light propagation medium is substantially linear.

17. The spectral imager of claim 1, wherein said light propagation medium is curved.

18. The spectral imager of claim 1, further comprising an optical collector directing light to said one end of the medium.

19. The spectral imager of claim 18, wherein said light collector redirects light substantially transverse to said elongate medium to a path generally in the elongate direction of said medium.

20. The spectral imager of claim 19, wherein said light collector is substantially square or circular, and said light propagation medium is curved to fit within an area less than the area of said light collector.

21. The spectral imager of claim 1, wherein said medium's length is at least an order of magnitude greater than its thickness.

22. A spectral imager comprising:
a first elongate light propagation medium arranged to receive light at one end, and structured to have a spectral absorption coefficient gradient in the elongate direction,
detectors distributed along said medium in the elongate direction to detect light absorbed by said medium,
wherein the spectral absorption properties of said medium are graded in the elongate direction along a first surface of said medium,
wherein the spectral absorption properties of said medium along said first surface are graded from lower to higher wavelengths in the direction of light propagation through said medium,
wherein said medium includes a second surface opposite said first surface, wherein the spectral absorption properties of said medium along said second surface are graded in the direction of light propagation through said medium, but at lesser absorption wavelengths than along said first surface at corresponding distances in the elongate direction.

23. The spectral imager of claim 22, wherein said first and second surfaces are parallel to each other.

24. The spectral imager of claim 22, wherein the spectral absorption properties of said medium are substantially uniform in a direction transverse to said elongate direction.

25. The spectral imager of claim 24, wherein said first and second medium surfaces in the elongate direction that are angled to each other.

26. The spectral imager of claim 22, further comprising optical resonator cells distributed along said medium in the elongate direction and tuned to the spectral absorption properties of said medium at their respective locations.

27. The spectral imager of claim 26, said resonator comprising distributed Bragg reflectors along a first elongate surface of said medium.

28. The spectral imager of claim 22, further comprising a readout circuit connected to said detectors to sense the spectral characteristic of light propagating through said medium.

29. The spectral imager of claim 28, wherein said readout circuit includes circuitry to obtain a readout of a different functionality from less than all of said detectors.

30. The spectral imager of claim 28, wherein said readout circuit includes circuitry to monitor continuously each of said detectors, and to obtain a timed readout from less than all of said detectors at a desired time.

31. The spectral imager of claim 22, further comprising additional elongate light propagation media and respective detectors similar to said first medium and its detectors, all of said media collectively comprising a pixel array.

32. The spectral imager of claim 31, wherein said media are optically isolated from each other.

33. The spectral imager of claim 31, said pixel array comprising a linear array.

34. The spectral imager of claim 31, said pixel array comprising a two-dimensional array.

35. The spectral imager of claim 34, said two-dimensional array comprising a plurality of stacked linear arrays.

36. The spectral imager of claim 22, wherein said light propagation medium is substantially linear.

37. The spectral imager of claim 22, wherein said light propagation medium is curved.

38. The spectral imager of claim 22, further comprising an optical collector directing light to said one end of the medium.

39. The spectral imager of claim 38, wherein said light collector redirects light substantially transverse to said elongate medium to a path generally in the elongate direction of said medium.

40. The spectral imager of claim 39, wherein said light collector is substantially square or circular, and said light propagation medium is curved to fit within an area less than the area of said light collector.

41. The spectral imager of claim 22, wherein said medium's length is at least an order of magnitude greater than its thickness.

42. A graded optical medium, comprising:
an elongate optical medium having spectral absorption properties which are graded both in the elongate direction of said medium and in a direction transverse to said elongate direction, said medium having opposed elongate surfaces, wherein its spectral absorption properties are graded along both of said surfaces in the elongate direction, but the medium at one of said surfaces absorbs higher wavelength light than at the other surface at corresponding elongate distances along the medium.

43. The graded optical medium of claim 42, wherein said opposed surfaces are parallel.

44. The graded optical medium of claim 42, further comprising sets of distributed Bragg reflectors distributed in an elongate direction along a surface of the medium.

45. The graded optical medium of claim 42, wherein said medium's length is at least an order of magnitude greater than its thickness.

46. The graded optical medium of claim 42, further comprising sets of distributed Bragg reflectors distributed in an elongate direction along a surface of the medium.

47. The graded optical medium of claim 42, wherein said medium's length is at least an order of magnitude greater than its thickness.

48. A method of fabricating a spectral imager, comprising:
growing an optical medium on a substrate with a graded spectral absorption in a direction transverse to the substrate, and an elongate dimension parallel to the substrate;
establishing a spectral absorption gradient in said medium along its elongate direction; and
removing said substrate from the said medium after varying the medium's thickness;
wherein said spectral absorption gradient is established by varying the medium's thickness along its elongate direction;
wherein the thickness of said medium is varied by forming a bevel in the medium opposite said substrate; and
wherein said medium is graded away from said substrate to a higher absorption wavelength, and said bevel is formed so that the thickness of said medium transverse to the substrate increases in the direction of increasing average spectral absorption.

49. The method of claim 48, further comprising distributing optical detectors along said medium in its elongate direction.

50. The method of claim 49, further comprising connecting a readout circuit to said detectors.

51. A method of fabricating a spectral imager, comprising:
growing an optical medium on a substrate with a graded spectral absorption in a direction transverse to the substrate, and an elongate dimension parallel to the substrate;
establishing a spectral absorption gradient in said medium along its elongate direction;
removing said substrate from the said medium after varying the medium's thickness;
wherein said spectral absorption gradient is established by varying the medium's thickness along its elongate direction, and
wherein the thickness of said medium is varied by forming a bevel in the medium opposite said substrate, and a parallel bevel is formed in the medium opposite the first bevel after the substrate has been removed.

52. The method of claim 51, further comprising distributing optical detectors along said medium in its elongate direction.

53. The method of claim 52, further comprising connecting a readout circuit to said detectors.

54. The method of claim 53, wherein said readout circuit is connected by flip-chip bonding.

55. The method of claim 51, wherein said optical medium is grown as a thin layer on said substrate, further comprising channeling said layer in its elongate direction with optically nonconductive spacings between channels to form a layer of parallel, optically isolated optical channels which establish a linear pixel array at one end.

56. The method of claim 55, further comprising forming additional similar layers of parallel, optically isolated optical channels which establish respective linear pixel arrays at one end, and stacking said layers to form a two-dimensional pixel array.

57. A graded optical medium, comprising:
an elongate optical medium having spectral absorption properties which are graded both in the elongate direction of said medium and in a direction transverse to said elongate direction, said medium having opposed elongate surfaces, wherein the spectral absorption properties of said medium are graded along only one of said surfaces in the elongate direction; and
sets of distributed Bragg reflectors distributed in an elongate direction along a surface of the medium.

58. A graded optical medium, comprising:
an elongate optical medium having spectral absorption properties which are graded both in the elongate direction of said medium and in a direction transverse to said elongate direction, said medium having opposed elongate surfaces, wherein the spectral absorption properties of said medium are graded along only one of said surfaces in the elongate direction;
wherein said medium's length is at least an order of magnitude greater than its thickness.

59. A method of fabricating a spectral imager, comprising:
growing an optical medium on a substrate with a graded spectral absorption in a direction transverse to the substrate, and an elongate dimension parallel to the substrate;
establishing a spectral absorption gradient in said medium along its elongate direction;
distributing optical detectors along said medium in its elongate direction; and
connecting a readout circuit to said detectors;
wherein said spectral absorption gradient is established by varying the medium's thickness along its elongate direction;
wherein the thickness of said medium is varied by forming a bevel in the medium opposite said substrate;
wherein said medium is graded away from said substrate to a higher absorption wavelength, and said bevel is formed so that the thickness of said medium transverse to the substrate increases in the direction of increasing average spectral absorption; and
wherein said readout circuit is connected by flip-chip bonding.

60. A method of fabricating a spectral imager, comprising:
growing an optical medium on a substrate with a graded spectral absorption in a direction transverse to the substrate, and an elongate dimension parallel to the substrate; and
establishing a spectral absorption gradient in said medium along its elongate direction;

wherein said spectral absorption gradient is established by varying the medium's thickness along its elongate direction;

wherein the thickness of said medium is varied by forming a bevel in the medium opposite said substrate;

wherein said medium is graded away from said substrate to a higher absorption wavelength, and said bevel is formed so that the thickness of said medium transverse to the substrate increases in the direction of increasing average spectral absorption; and wherein said optical medium is grown as a thin layer on said substrate, further comprising channeling said layer in its elongate direction with optically nonconductive spacings between channels to form a layer of parallel, optically isolated optical channels which establish a linear pixel array at one end.

61. The method of claim 60, further comprising forming additional similar layers of parallel, optically isolated optical channels which establish respective linear pixel arrays at one end, and stacking said layers to form a two-dimensional pixel array.

* * * * *